United States Patent Office 3,541,115
Patented Nov. 17, 1970

3,541,115
AROMATIC QUINONE PRODUCTION
William A. Michalowicz, Verona, Pa., assignor to Koppers Company, Inc., a corporation of Delaware
No Drawing. Filed June 8, 1967, Ser. No. 644,491
Int. Cl. C07c 49/68, 49/70
U.S. Cl. 260—385     5 Claims

ABSTRACT OF THE DISCLOSURE

Phenanthrene and anthracene are oxidized to 9,10-phenanthraquinone and 9,10-anthraquinone by chlorine oxidation in aqueous media. Phenathrene or anthracene is contacted with gaseous chlorine while in aqueous suspension, at a temperature of 100–225° C. The phenanthrene or anthracene is oxidized by the chlorine in the presence of three to ten mole percent bromine based on the total amount of chlorine and bromine present, which bromine may be present in the form of an inorganic salt and which is released during the reaction. Phenanthraquinone and anthraquinone are valuable compounds used in medicines, dyestuffs, and in the preparation of numerous fungicides and insecticides.

BACKGROUND OF THE INVENTION

Numerous methods have been proposed for the preparation of phenanthraquinone from phenanthrene and anthraquinone from anthracene, such as oxidation with permanganates, dichlromates and peroxides or the ozonation processes such as that described by Sturrock et al. in U.S. 2,898,350. Such processes, while useful on a laboratory scale, are found to be much too expensive to be used for commercial purposes.

In German Pat. 1,166,176 a process is described for the preparation of phenanthraquinone by the chlorine oxidation of phenanthrene in a methanol-water system. This process, an extension of the methanol process, uses water in order to lower the danger of explosion. The description implies that the water content of the solvent must be limited to permit solubility of the phenanthrene in the system, said solubility being a condition of the reaction. A problem exists in a methanol-water system because of the loss of starting materials, chlorine, in the formation of formaldehyde and formic acid by reaction of chlorine with methanol. Any hydrogen chloride formed in such a system also reacts with methanol to form methyl chloride or methyl ether, creating hazards such as toxicity and explosive by-products and loss of starting materials.

It has been found that phenanthrene and anthracene can be oxidized with chlorine in aqueous media at temperatures in the order of 100–225° C. and phenanthraquinone or anthraquinone are produced in good yields if a small amount of bromine or bromide is present during the oxidation.

SUMMARY OF THE INVENTION

In accordance with the present invention, the aromatic hydrocarbons phenanthrene or anthracene in aqueous suspension is contacted with chlorine at a temperature of 100–225° C. The liquid-phase reaction is carried out in the presence of 3–10 mole percent of bromine or bromide, based on the total amount of chlorine and bromine, and the phenanthrene or anthracene is oxidized to the aromatic quinone, phenanthraquinone or anthraquinone, which is readily separated from the reaction mixture.

DETAILED DESCRIPTION

The novel process of the invention uses no organic solvents. The phenanthrene or anthracene are not solubilized in the aqueous system, but rather a suspension is produced. The aqueous media does participate in the reaction and is necessary to provide oxygen during the phenanthraquinone or anthraquinone formation. The amount of water necessary for the reaction is theoretically only about two moles per mole of phenanthrene or anthracene, but an excess over this amount is necessary to provide a workable system. The use of about one liter of water per mole of phenanthrene or anthracene has been found to result in some clumping or clustering of the phenanthrene or anthracene which prevents adequate contact with the chlorine to allow oxidation, and water in excess of this amount should be used. The more dilute the reaction system, the more readily the contact occurs and thus, excess water is preferred. It has been found that about three liters of water per mole of phenanthrene or anthracene provide adequate contact and ready handling of the reaction mixture, although amounts in excess of this are useable, the excess being limited by reactor size and economic considerations.

Chlorine is passed into the aqueous suspension of phenanthrene or anthracene to cause oxidation. The amount of chlorine should be in the range of one to four moles per mole of phenanthrene or anthracene. Preferably, about three and one-half moles of chlorine are used for each mole of phenanthrene or anthracene. If less than about one mole of chlorine is used, only low yields of phenanthraquinone or anthraquinone result while an excess over about four provides no benefit and is uneconomical.

The addition of bromine or inorganic bromides which would release bromine provides increased yields of phenanthraquinone or anthraquinone. The use of bromine alone, without any chlorine, provides no more phenanthraquinone or anthraquinone than does the use of a minor amount of bromine with chlorine. The use of a catalytic amount of bromine or bromide in an amount of about 3–10 mole percent of total halogen provides the best results.

As the bromine source, either bromine itself may be used or inorganic bromides can be used which release bromine during the reaction. Examples of such bromides are the alkaline earth metal bromides and the alkali metal bromides such as sodium bromide, potassium bromide, lithium bromide and calcium bromide. Ammonium bromide may also be used.

Since the chlorine used in the reaction is converted to hydrogen chloride, a reaction vessel resistant to hydrochloric acid corrosion should be used. Such reactors could be glass lined or made of material such as tantalum which are resistant to hydrochloric acid. Or, if conventional reactors are used, an acid scavenger such as magnesium carbonate, magnesium oxide, or calcium carbonate may be added to the mixture to serve as a scavenger for hydrogen chloride. Any such scavenger must be used in an amount so as not to raise the pH of the system above about 7.5. Above this pH value, practically no phenanthraquinone or anthraquinone is obtained because of the formation of hypochlorites which retard the desired reaction.

The reaction is carried out at a temperature between 100–225° C. The reflux temperature of water is useable, but higher temperature are preferred. If lower temperatures are used, the reaction is too slow to be practical, whereas higher temperatures would require high pressure equipment and are to be avoided.

The reaction can be carried out at atmospheric pressure, or if a higher temperature than reflux is used, at the vapor pressure of the aqueous reaction mixture. No benefits are found by either using the pressure in excess of the vapor pressure or in using pressures below atmospheric.

It is beneficial during the reaction to supply adequate stirring to disperse the phenanthrene in the aqueous media. In addition to stirring, surfactants may be added to provide a better dispersion.

The major by-product produced during the reaction is mono-chloro phenanthrene or mono-chloroanthracene. These by-products are readily separated from the desired phenanthraquinone or anthraquinone by simple solvent washing. Phenanthraquinone and anthraquinone have only limited solubility in organic solvents such as ether, benzene, toluene and xylene whereas 9-chlorophenanthrene or chloroanthracene are very soluble in common organic solvents. Suitable solvents are those which are relatively immiscible with water, but dissolve the organic products, such as the hydrocarbons and (e.g. hexane, benzene, xylene, cyclohexane, toluene); and ethers (e.g. diethyl ether).

This 9-chlorophenanthrene or chloroanthracene is not, however, a by-product which is detrimental since it also can be fed back into the aqueous media and oxidized, as is the phenanthrene or anthracene, to give additional phenanthraquinone or anthraquinone.

My invention is further illustrated by the following examples.

EXAMPLE I

To a two liter Morton flask, there was charged 53.4 grams (0.30 mole, 98% purity) of phenanthrene, 1.1 liters of water, 15.6 grams (0.15 mole) of sodium bromide and 105 grams (1.05 moles) of calcium carbonate. The flask was equipped with a high-speed stirrer (7000–8000 r.p.m.). The charge, having a pH of about 7.4, was heated to reflux (102° C.) and gaseous chlorine (74.5 grams, 1.05 moles) was introduced beneath the liquid during a period of 4 hours. The reaction mixture was refluxed an additional 0.5 hour, cooled to 25° C. and the aqueous portion removed. The residual solid was slurried with benzene (300 mls.) and filtered. The soluble portion was found to be predominantly 9-chlorophenanthrene. The recovered solid, crude phenanthraquinone, thus obtained, was slurried with dilute HCl to remove any entrapped calcium carbonate. The recovered solid, 38.3 grams (61% yield) had a melting point of 204–206° C. and analysis by infrared spectrometry showed it to be 9,10-phenanthraquinone. Recrystallization from xylene raised the melting point to 208° C.

EXAMPLE II

The procedure of Example I was followed closely except that the sodium bromide (bromine source) was omitted from the reaction mixture. The reaction resulted in a yield of only 45% of crude phenanthraquinone, melting at 203–205° C. This evidences the distinct catalytic effect of only a small amount of a bromine source and the resulting increased yield when bromine is present.

EXAMPLE III

There was charged to a one liter Morton flask equipped with a variable-speed stirrer, 35.6 grams (0.2 mole) of phenanthrene, 700 mil of water, 10.4 grams (0.1 mole) sodium bromide and 1.8 grams of Aliquot 4 (a commercial emulsifier). The all-glass reactor was heated and the contents (pH 7.0) refluxed (102° C.), while 49.7 grams of chlorine was introduced (140 min.) into the reactor beneath the liquid. The contents of the flask were stirred at a stirrer rate of approximately 1500–2000 r.p.m. throughout the reaction. The system was refluxed an additional 0.5 hour, cooled to 25° C. and the aqueous phase removed. The residual solid was slurried with 400 ml. of ethyl ether, filtered and the crude 9,10-phenanthraquinone vacuum dried to yield 23.8 grams (57%) of product melting at 196–203° C.

EXAMPLE IV

A duplicate of Example III was carried out except that the stirrer rate was about 800–900 r.p.m. This inadequate stirring rate lowered the yield of phenanthraquinone to 19.1 grams or a 46% yield, showing the beneficial result of using an adequate dispersion.

EXAMPLE V

The 9-chlorophenanthrene from Example I was returned to the reactor and oxidized generally according to the procedure of Example I. The 9-chlorophenanthrene was oxidized to phenathraquinone in good yields.

EXAMPLE VI

To a two-liter Morton flask, equipped with a high-speed stirrer, there was charged 53.4 grams (0.30 mole) anthracene, 1.1 liters of water, 15.6 grams sodium bromide, and 105 grams (1.05 moles) of calcium carbonate. The reaction mixture was heated to reflux (102° C.) and stirred at 7000–8000 r.p.m. while 74.5 grams (1.05 moles) of chlorine was introduced beneath the surface of the liquid during 150 minutes. The reaction mixture was refluxed an additional 0.5 hour, cooled, and the system filtered. The residual crude 9,10-anthraquinone was washed with dilute HCl and water, then vacuum dried. The dry product was slurried with 300 mls. of acetone, filtered and the residue vacuum dried. The recovered anthraquinone 57.4 grams (92% yield) melted at 282–285° C.

EXAMPLE VII

To a glass reactor was fed 10.0 grams (0.056 mole) of phenanthrene, 200 mil of water and 1.2 grams (0.012 mole) of sodium bromide. The reaction mass was heated to 140° C. in the sealed reactor and stirring supplied by a magnetic stirring bar. Chlorine (ca. 0.15 mole) was fed to the reactor during 120 min. The resultant product gave 5.0 grams of phenanthraquinone (43%) melting 195–207° C. It is thus shown that even with poor stirring, at a temperature of 140° C., a substantially quantity of phenanthraquinone is produced.

What is claimed is:

1. Process for the preparation of an aromatic quinone selected from the group consisting of phenanthraquinone and anthraquinone from an aromatic hydrocarbon selected from the group consisting of phenanthrene and anthracene comprising, contacting in a vessel resistant to hydrochloric acid or in a vessel in which is present an acid scavenger in an amount so as not to raise the pH above 7.5, said aromatic hydrocarbon in liquid phase and in an aqueous suspension containing water in an amount greater than one liter per mole of aromatic hydrocarbon with gaseous chlorine at a temperature of 100–225° C. and in the presence of 3–10 mole percent bromine based on the total amount of said chlorine and bromine to oxidize said aromatic hydrocarbon to said aromatic quinone, and separating said aromatic quinone from chlorinated by-products.

2. The process of claim 1 wherein said bromine is present in said aqueous suspension in the form of an inorganic bromide.

3. The process of claim 1 wherein said chlorine is present in an amount of 3–4 moles per mole of said aromatic hydrocarbon.

4. Process for the preparation of phenanthraquinone from phenanthrene comprising contacting in a vessel resistant to hydrochloric acid or in a vessel in which is present an acid scavenger in an amount so as not to raise the pH above 7.5, phenanthrene in liquid phase and in aqueous suspension containing water in an amount in excess of one liter per mole phenanthrene, with gaseous chlorine at a temperature of 100–225° C. and in the presence of 3–10 mole percent bromine based on the total amount of said chlorine and bromine to oxidize said phenanthrene to phenanthraquinone, and separating said phenanthraquinone from chlorinated by-products.

5. Process for preparing anthraquinone from anthracene comprising contacting in a vessel resistant to hydrochloric acid or in a vessel in which is present an acid scavenger in an amount so as not to raise the pH above 7.5, anthracene in liquid phase and in aqueous suspension containing water in excess of one liter per mole of anthracene with gaseous chlorine at a temperature of 100–225° C. and in the presence of 3–10 mole percent of bromine based on the total amount of chlorine and bromine to oxidize said anthracene to anthraquinone, and separating said anthraquinone from chlorinated by-products.

References Cited

UNITED STATES PATENTS 2,898,350   8/1959   Sturrock et al. _____ 260—385

FOREIGN PATENTS 1,166,176   3/1964   Germany.

OTHER REFERENCES

Houben, Ous Anthracen und die Anthrachinone, p. 211, 1929.

LORRAINE A. WEINBERGER, Primary Examiner

R. GERSTL, Assistant Examiner

260—396